United States Patent [19]

Henn et al.

[11] Patent Number: 4,996,103
[45] Date of Patent: Feb. 26, 1991

[54] COMPOSITE ELEMENTS HAVING IMPROVED RESISTANCE AGAINST STRESS CRACKING CORROSION, MOST PREFERABLY FOR LOW TEMPERATURE HOUSING COMPARTMENTS

[76] Inventors: Rolf Henn, 7 Adolf-Engelhardt-Strasse, 6900 Heidelberg; Reinhard Leppkes, 2 Eschkopfstrasse, 6712 Bobenheim-Roxheim, both of Fed. Rep. of Germany

[21] Appl. No.: 502,189

[22] Filed: Mar. 30, 1990

[30] Foreign Application Priority Data

April 22, 1989 [DE] Fed Rep of Germany ...... 3913328

[51] Int. Cl.$^5$ .............................................. B32B 3/26
[52] U.S. Cl. ............................. 428/305.5; 428/319.7
[58] Field of Search .......................... 428/305.5, 319.7

[56] References Cited

U.S. PATENT DOCUMENTS

| | | | |
|---|---|---|---|
| 2,976,577 | 3/1961 | Gould | 428/319.7 |
| 3,398,035 | 8/1968 | Cleereman et al. | 428/319.7 |
| 3,640,938 | 2/1972 | Finelli | 428/319.7 |

Primary Examiner—William J. Van Balen
Attorney, Agent, or Firm—Martin P. Connaughton

[57] ABSTRACT

The invention deals with composite elements having improved resistance against stress cracking corrosion especially for low temperature housing compartments, comprising:
(a) at least one top layer of polystyrene, preferably toughened polystyrene, having certain mechanical properties; and
(B) a layer of polyurethane foam, preferably polyurethane rigid foam;

said polyurethane rigid foam prepared while using difluorochloromethane as a blowing agent or a blowing agent mixture which essentially comprises water, difluorochloromethane, and optionally trichlorofluoromethane.

10 Claims, 1 Drawing Sheet

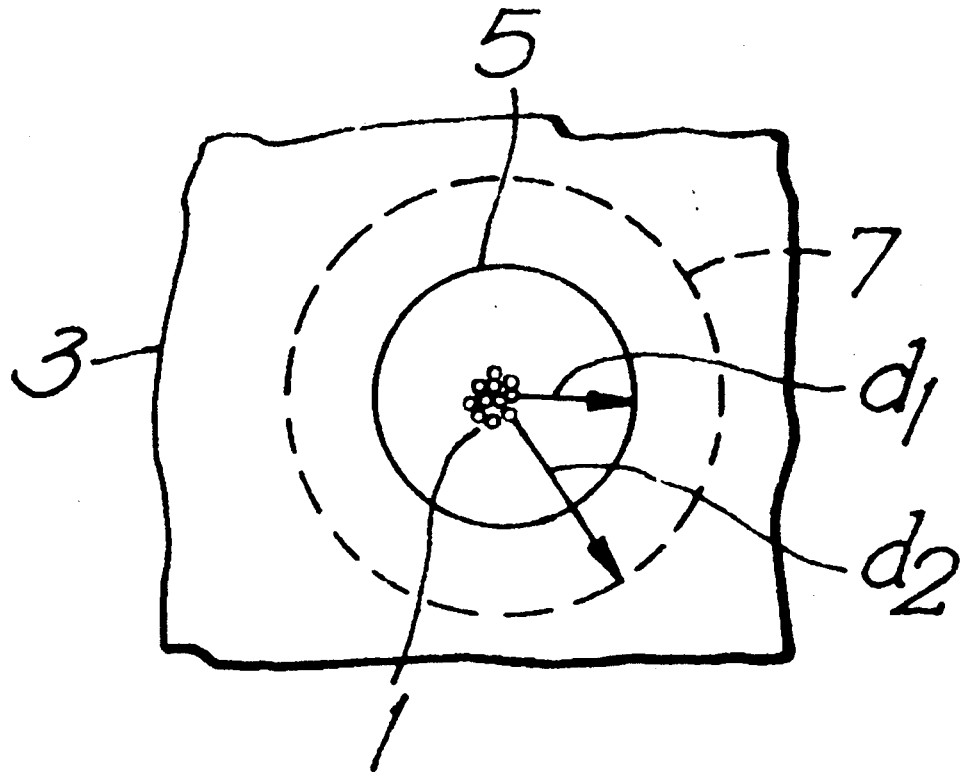

COMPOSITE ELEMENTS HAVING IMPROVED RESISTANCE AGAINST STRESS CRACKING CORROSION, MOST PREFERABLY FOR LOW TEMPERATURE HOUSING COMPARTMENTS

BACKGROUND OF THE INVENTION

1. Field of the Invention

The present invention deals with composite elements having improved resistance against stress cracking corrosion, comprising:
(A) at least one top layer preferably from a toughened polystyrene; and
(B) a layer of preferably polyurethane rigid foam, whereby said rigid foam is prepared while using difluorochloromethane or a mixture of water, difluorochloromethane, and optionally trichlorofluoromethane as a blowing agent.

2. Description of the Related Art

The preparation of composite elements made from a polyurethane rigid foam (polyurethane is henceforth abbreviated PU) and at least one top layer of a rigid or elastic material is well known. Such composite elements are, for example, insulation panels having top layers of kraft paper, asbestos paper, or crepe paper, bituminized paper, polyethylene coated glass non-wovens, and aluminum foils; construction elements having dual sided metal covering layers from, for example, painted or coated steel sheets or aluminum sheets; or combination plaques having a top layer of a rigid panel such as, for example, a backing panel, a gypsum panel, a cardboard panel, a glass fiber panel, a rock wool panel, or a perlite panel, and a top layer from, for example, bitumen paper, or a glass non-woven material. Typical blowing agents used to prepare the polyurethane rigid foams which are suitable as an intermediate layer are preferably trichlorofluoromethane and dichlorodifluoromethane optionally used in combination with carbon dioxide formed from the reaction of an isocyanate with water.

Also known is foaming hollow spaces in household appliances such as, for example, refrigerators or hot water tanks using polyurethane rigid foam as a heat insulating material. In order to avoid cavities or pockets in the isolated hollow area, the foamable polyurethane reaction mixture must be injected into the hollow space within a short time, for example, 5 to 10 seconds. To foam such household appliances, low pressure machines or preferably, high pressure machines, are used.

Typical insulating polyurethane rigid foams can be prepared conventionally by reacting organic polyisocyanates with one or more higher molecular weight compounds having at least 2 reactive hydrogen atoms, preferably polyester polyols and/or polyether polyols optionally in conjunction with lower molecular weight chain extending agents and/or crosslinking agents, in the presence of catalysts, blowing agents, and optionally auxiliaries and/or additives. By properly selecting the starting components, one can obtain polyurethane rigid foams having very low coefficients of thermal conductivity. Such foams, even at low densities, possess excellent mechanical properties.

As previously stated, trichlorofluoromethane is preferably used as the blowing agent in the preparation of the insulating polyurethane rigid foams. The inside housing and door jacketing of refrigerators and the inside cover of freezer chests generally is made of toughened polystyrene. This material has a disadvantage in that it is not resistant to liquid or gaseous trichlorofluoromethane. Even after short term contact with gaseous trichlorofluoromethane from the foaming reaction mixture which forms the polyurethane rigid foam, the deep drawn wall segments of toughened polystyrene can be damaged on account of their inner stress or tension. In order to avoid so called stress cracking corrosion, combination panels of toughened polystyrene are frequently used for the deep drawn parts, which are protected by a thin ABS film or polyethylene film on the side facing the polyurethane rigid foam. Another disadvantage is that there is little adhesion between the housing portion of toughened polystyrene and the polyurethane foam which diminishes the mechanical strength of the molded part produced.

A comprehensive overview concerning the preparation of composite elements while using polyurethane rigid foams as covering layers or preferably core layers, as well as using polyurethane rigid foams in household appliances or in low temperature technology has been published in *Polyurethanes, Plastics Handbook*, Volume 7, Second Edition, 1983, edited by Dr. Günter Oertel, Carl-Hanser Publishers, Munich, Vienna, pages 250 ff.

In addition to trichlorofluoromethane previously cited other physically effective blowing agents can be used in the preparation of polyurethane rigid foams. One example is found in DE-C-1 045 644 (USA 3 391 093) which discloses gaseous hydrocarbons having not more than 3 carbon atoms, such as methane, ethane, ethylene, propane, and propylene, and halogenated hydrocarbons such as, for example, chloromethane, dichlorodifluoromethane, dichlorofluoromethane, chlorodifluoromethane, chloroethane, and dichlorotetrafluoroethane as well as octafluorocyclobutane and hexafluoropropane. Another example is found in Belgian Patent 596 608 which discloses halogen alkanes such as, for example, 1,1-difluoro-2,2-dichloroethane, 1,2-difluoro-1,2-dichloroethane, 1,1-dichloroethane, 1-fluoro-1,2-dichloroethane, 1-fluoro-2,2-dichloroethane 1,2-dichloroethane, trichloroethane, tetrachloroethane, 1-fluoro-2,2-trichloroethane, bromomethane, and 1,1,2-trifluoro-2-chlorethane.

The aforesaid blowing agents have somewhat of a disadvantage in that they are toxic and/or combustible, or compared to trichlorofluoromethane they possess a lower gas yield when blowing polyurethane foam because of their boiling point, or they make the polyurethane foam have a lower insulating effect and finally they also cause stress cracking corrosion.

To avoid stress cracking corrosion on toughened polystyrene, FR-B-1 564 594 discloses the preparation of refrigerators while using trichlorofluoroethane (F 113) and dichlorotetrafluoroethane (F 114). These perhalogenated hydrocarbons, however, like trichlorofluoromethane are suspected of damaging the ozone layer and their use is prohibited according to the Montreal Protocol regarding protection of the ozone layer. Another blowing agent is carbon dioxide, which according to GB-A-21 16 574 can be dissolved under pressure in at least one starting component to prepare polyurethane rigid foam; said carbon dioxide can be thermally cleaved from salts such as, for example, carbamates; carbonates, such as, for example, ammonium carbonate; or bicarbonates, or it can be formed from the reaction of isocyanate with water to form urea groups. Along with established industrial processing difficulties when using solid carbon dioxide or gaseous carbon dioxide under pressure, this method of preparing polyurethane rigid foams also has a significant disadvantage in that the thermal conductivity of the carbon dioxide is twice as high as that compared to trichlorofluoromethane and the result is that the foams have a lower insulation value which at present is generally unacceptable.

The object of the present invention was to develop composite elements especially suited for low temperature housing compartments, having improved resistance against stress cracking corrosion whereby the aforesaid disadvantages would be overcome particularly with respect to the toxicological and environmental hazards of the blowing agent in the insulating material and/or in the preparation of the insulating material.

This object was surprisingly met by using toughened polystyrene in combination with polyurethane foams prepared while using difluorochloromethane.

Accordingly, the subject invention pertains to composite elements having improved resistance against stress cracking corrosion, comprising:
(A) at least one covering layer of polystyrene, preferably toughened polystyrene; and
(B) a layer of polyurethane rigid foam, preferably polyurethane rigid foam;
wherein difluorochloromethane is used as the blowing agent in the preparation of the polyurethane foam.

The subject invention further pertains to using such composite elements for low temperature housing compartments according to claim 8.

The difluorochloromethane suitable as a blowing agent in the preparation of the polyurethane foam according to the present invention has an advantage in that it is non-toxic and non-combustible. Moreover, as a commercial product it is available at low prices in large quantities. The thermal conductivity coefficient of difluorochloromethane is indeed greater than that of trichlorofluoromethane, however, clearly smaller than that of carbon dioxide. Another advantage is that gaseous difluorochloromethane having a boiling point of $-40.8°$ C. is very easily soluble in the polyhydroxyl compounds used in the preparation of polyurethane foams. The solubility, for example, is clearly greater than that of gaseous dichlorodifluoromethane having a boiling point of $-29.8°$ C. which is used in special processes in small quantities as a pre-foaming agent in the preparation of polyurethane rigid foams. The solubility of difluorochloromethane depending on the type of polyurethane foam formulation at 20° C. is from 4 to 6 weight percent, based on the weight of the polyhydroxyl compound, per bar of pressure. If ozone layer damage should occur by the difluorochloromethane, ten this would be smaller by a factor of 20, quantity related, compared to trichlorofluoromethane whereby this advantageous effect would even be further reinforced through the higher gas yields when foaming.

DESCRIPTION OF THE PREFERRED EMBODIMENTS

Figure 1:
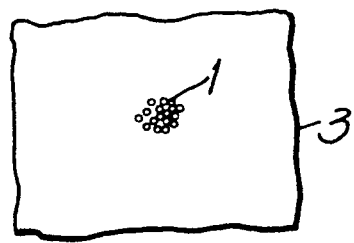

The composite elements of the present invention possess at least one top or covering layer of polystyrene, preferably however, two covering layers of polystyrene, that is preferably toughened polystyrene and an intermediate layer of polyurethane foam, more preferably polyurethane rigid foam. However, according to a most preferred embodiment, for example, when preparing low temperature housing compartments, a hollow compartments is foamed of impact resistant modified polystyrene molded foams so that the polyurethane rigid foam has a polystyrene covering layer on all sides.

(A) Polystyrenes, preferably toughened polystyrenes, having the following mechanical properties are used in the preparation of said top layer (A):

a tensile strength according to DIN 53455 of from 20 to 45 $N/mm^2$, more preferably 24 to 32 $N/mm^2$;

a percentage elongation at break according to DIN 53455 of from 15 to 45 percent, more preferably 35 to 42 percent;

a modulus of elasticity (tensile test) according to DIN 53457 of from 1650 to 2800 $N/mm^2$, more preferably 1650 to 2000 $N/mm^2$;

a flexural strength according to DIN 53452 of from 36 to 78 $N/mm^2$, more preferably 36 to 50 $N/mm^2$;

an impact strength according to DIN 53453 at 23° C. without break from 65 $kJ/m^2$ and larger; more preferably at $-40°$ C. without break up to 65 $kJ/m^2$ and greater; and most preferably 58 to 65 $kJ/m^2$; and a notched bar impact strength according to DIN 53453 of from 4 to 10.5 $kJ/m^2$, more preferably 7 to 9 $kJ/m^2$, whereby the mechanical properties are measured on injection molded, normal small bars or on shoulder bars according to DIN 53455. Polystyrenes having selected mechanical properties are among the commercial trade products.

(B) As already established the polyurethane foam layer (B) is preferably a polyurethane foam intermediate layer and most preferably the hollow space of the molded article is foamed using a polyurethane rigid foam which is prepared by reacting:
(a) organic, preferably aromatic polyisocyanates with:
(b) at least one polyhydroxyl compound having a functionality of from 2 to 8, and a hydroxyl number of from 300 to 850, and optionally;
(c) chain extending agents and/or crosslinking agents;
in the presence of:
(d) catalysts; and
(e) difluorochloromethane as a blowing agent as well as;
(f) optionally auxiliaries and/or additives.

The following should be noted with respect to starting components (a) through (f) used in the preparation of the polyurethane foams:

(a) the organic polyisocyanates include all essentially known aliphatic, cycloaliphatic, araliphatic and preferably aromatic multivalent isocyanates.

Specific examples include: alkylene diisocyanates with 4 to 12 carbons in the alkylene radical such as 1,12-dodecane diisocyanate, 2-ethyl-1,4-tetramethylene diisocyanate, 2-methyl-1,5-pentamethylene diisocyanate, 1,4-tetramethylene diisocyanate and preferably 1,6-hexamethylene diisocyanate; cycloaliphatic diisocyanates such as 1,3- and 1,4-cyclohexane diisocyanate as well as any mixtures of these isomers, 1-isocyanato-3,3,5-trimethyl-5isocyanatomethylcyclohexane (isophorone diisocyanate), 2,4- and 2,6-hexahydrotoluene diisocyanate as well as the corresponding isomeric mixtures, 4,4'-, 2,2'-, and 2,4'dicyclohexylmethane diisocyanate as well as the corresponding isomeric mixtures and preferably aromatic diisocyanates and polyisocyanates such as 2,4- and 2,6-toluene diisocyanate and the corresponding isomeric mixtures, 4,4'-, 2,4'-, and 2,2'-diphenylmethane diisocyanate and the corresponding isomeric mixtures, mixtures of 4,4'-and 2,4'-diphenylmethane diisocyanates and polyphenylpolymethylene polyisocyanates, mixtures of 4,4'-, 2,4'-, and 2,2'- diphenylmethane diisocyanates and polyphenyl polymethylene polyisocyanates, (polymeric MDI), as well as mixtures of polymeric MDI and toluene diisocyanates. The organic di- and polyisocyanates can be used individually or in the form of mixtures.

Frequently, so-called modified multivalent isocyanates, i.e., products obtained by chemical reaction of organic diisocyanates and/or polyisocyanates, are used. Examples include diisocyanates and/or polyisocyanates containing ester groups, urea groups, biuret groups, allophanate groups, carbodiimide groups, isocyanurate groups, uretdione groups and/or urethane groups. Specific examples include organic, preferably aromatic, polyisocyanates containing urethane groups and having an NCO content of 33.6 to 15 weight percent, preferably 31 to 21 weight percent, based on the total weight, e.g., with low molecular weight diols, triols, dialkylene glycols, trialkylene glycols or polyoxyalkylene glycols with a molecular weight of up to 1500; modified 4,4'-diphenylmethane diisocyanate or 2,4- and 2,6-toluene diisocyanate, where examples of di- and polyoxyalkylene glycols that may be used individually or as mixtures include diethylene glycol, dipropylene glycol, polyoxyethylene glycol, polyoxypropylene glycol and polyoxypropylene polyoxyethylene glycol. Prepolymers containing NCO groups with an NCO content of 25 to 9 weight percent, preferably 21 to 14 weight percent, based on the total weight and produced from the polyester polyols and/or preferably polyether polyols described below; 4,4'-diphenylmethane diisocyanate, mixtures of 2,4'- and 4,4'-diphenylmethane diisocyanate, 2,4-and/or 2,6-toluene diisocyanates or polymeric MDI are also suitable. Furthermore, liquid polyisocyanates containing carbodiimide groups and/or isocyanurate rings and having an NCO content of 33.6 to 15 weight percent, preferably 31 to 21 weight percent, based on the total weight, have also proved suitable, e.g., based on 4,4'- and 2,4'- and/or 2,2'-diphenylmethane diisocyanate and/or 2,4- and/or 2,6-toluene diisocyanate.

The modified polyisocyanates may optionally be mixed together or mixed with unmodified organic polyisocyanates such as 2,4'- and 4,4'-diphenylmethane diisocyanate, polymeric MDI, 2,4-and/or 2,6-toluene diisocyanate.

The following have proven especially successful as organic polyisocyanates and are preferred for use in the preparation of polyurethane foams: mixtures of 2,4- and 2,6-toluene diisocyanates, mixtures of toluene diisocyanates, and polymeric MDI, or mixtures of modified urethane groups containing modified polyisocyanates having a NCO content of from 33.6 to 15 weight percent most preferably, based on 4,4'-diphenylmethane diisocyanate or diphenylmethane diisocyanate isomeric mixtures and polymeric MDI and most preferably, polymeric MDI having a diphenylmethane diisocyanate isomeric content of from 30 to 80 weight percent.

(b) Preferred polyhydroxyl compounds (b) having a functionality of 2 to 8, more preferably 3 to 8, and a hydroxyl number of 150 to 850, preferably 350 to 800. For example, polythioether polyols, polyester amides, polyacetals containing hydroxyl groups, aliphatic polycarbonates and preferably, polyester polyol and polyether polyols. In addition mixtures of at least two of the aforesaid polyols can be used as long as these polyols have an average functionality and hydroxyl number in the aforesaid range.

Suitable polyester polyols can be produced, for example, from organic dicarboxylic acids with 2 to 12 carbons, preferably aliphatic dicarboxylic acids with 4 to 6 carbons, and multivalent alcohols, preferably diols, with 2 to 12 carbons, preferably 2 to 6 carbons. Examples of dicarboxylic acids include succinic acid, glutaric acid, adipic acid, suberic acid, azelaic acid, sebacic acid, decanedicarboxylic acid, maleic acid, fumaric acid, phthalic acid, isophthalic acid and terephthalic acid. The dicarboxylic acids can be used individually or in mixtures. Instead of the free dicarboxylic acids, the corresponding dicarboxylic acid derivatives may also be used such as dicarboxylic acid esters of alcohols with 1 to 4 carbons or dicarboxylic acid anhydrides. Dicarboxylic acid mixtures of succinic acid, glutaric acid and adipic acid in quantity ratios of 20–35:35–50:20–32 parts by weight are preferred, especially adipic acid. Examples of divalent and multivalent alcohols, especially diols, include ethanediol, diethylene glycol, 1,2- and 1,3-propanediol, dipropylene glycol, 1,4-butanediol, 1,5-pentanediol, 1,6-hexanediol, 1,10-decanediol, glycerine and trimethylolpropane. Ethanediol, diethylene glycol, 1,4-butanediol, 1,5-pentanediol, 1,6hexanediol, or mixtures of at least two of these diols are preferred, especially mixtures of 1,4-butanediol, 1,5-pentanediol and 1,6-hexanediol. Furthermore, polyester polyols of lactones, e.g., e-caprolactone or hydroxycarboxylic acids, e.g., 1-hydroxycaproic acid, may also be used.

The polyester polyols can be produced by polycondensation of organic polycarboxylic acids, e.g., aromatic or preferably aliphatic polycarboxylic acids and/or derivatives thereof and multivalent alcohols in the absence of catalysts or preferably in the presence of esterification catalysts, preferably in an atmosphere of inert gases, e.g., nitrogen, carbon monoxide, helium, argon, etc., in the melt at temperatures of 150° to 250° C., preferably 180° to 220° C., optionally under reduced pressure, up to the desired acid value, which is preferably less than 10, especially less than 2. In a preferred embodiment, the esterification mixture is subjected to polycondensation at the temperatures mentioned above up to an acid value of 80 to 30, preferably 40 to 30, under normal pressure and then under a pressure of less than 500 mbar, preferably 50 to 150 mbar. Examples of suitable esterification catalysts include iron, cadmium, cobalt, lead, zinc, antimony, magnesium, titanium and tin catalysts in the form of metals, metal oxides or metal salts. However, the polycondensation may also be performed in liquid phase in the presence of solvents and/or entraining agents such as benzene, toluene, xylene or chlorobenzene for azeotropic distillation of the water of condensation.

To produce the polyester polyols, the organic polycarboxylic acids and/or derivatives thereof and multivalent alcohols are preferably polycondensed in a mole ratio of 1:1–1.8, preferably 1:1.05–1.2.

The resulting polyester polyols preferably have a functionality of 2 to 3, and a hydroxyl number of 150 to 400, and especially 200 to 300.

However, polyether polyols, which can be obtained by known methods, are especially preferred for use as the polyols. For example, polyether polyols can be produced by anionic polymerization with alkali hydroxides such as sodium hydroxide or potassium hydroxide or alkali alcoholates, such as sodium methylate, sodium ethylate or potassium ethylate or potassium isopropylate as catalysts and with the addition of at least one initiator molecule containing 2 to 8, preferably 3 to 8, reactive hydrogens or by cationic polymerization with Lewis acids such as antimony pentachloride, boron trifluoride etherate, etc., or bleaching earth as catalysts from one or more alkylene oxides with 2 to 4 carbons in the alkylene radical.

Suitable alkylene oxides include, for example, tetrahydrofuran, 1,3-propylene oxide, 1,2- and 2,3-butylene oxide, styrene oxide and preferably ethylene oxide and 1,2-propylene oxide. The alkylene oxides may be used individually, in alternation, one after the other or as a mixture. Examples of suitable initiator molecules include water, organic dicarboxylic acids such as succinic acid, adipic acid, phthalic acid and terephthalic acid, aliphatic and aromatic, optionally N-mono- N,N-, and N,N'-dialkyl substituted diamines with 1 to 4 carbons in the alkyl radical such as optionally mono- and dialkyl-substituted ethylenediamine, diethylenetriamine, triethylenetetramine, 1,3-propylenediamine, 1,3- and 1,4-butylenediamine, 1,2-, 1,3-, 1,4-, 1,5- and 1,6-hexamethylenediamine, phenylenediamines, 2,3-, 2,4- and 2,6-toluenediamine and 4,4'-, 2,4'- and 2,2'-diaminodiphenylmethane.

Suitable initiator molecules also include alkanolamines such as ethanolamine, diethanolamine, N-methyl- and N-ethylethanolamine, N-methyl- and N-ethyldiethanolamine and triethanolamine plus ammonia. Multivalent alcohols, especially divalent and/or trivalent alcohols are preferred such as ethanediol, 1,2-propanediol and 1,3-propanediol, diethylene glycol, dipropylene glycol, 1,4-butanediol, 1,6-hexanediol, glycerine trimethylolpropane, pentaerythritol, sorbitol and sucrose.

The polyether polyols have a functionality of preferably 3 to 8 and especially 3 to 6 and have a hydroxyl number of 300 to 850, preferably 350 to 800.

Also suitable as polyether polyols are: melamine polyol dispersions according to EP A 23 987 (US A 4 293 657); polymer polyols dispersions prepared from polyepoxides and epoxide resin hardeners in the presence of polyols according to DE 29 43 689 (US A 43 05 861); dispersions of aromatic polyesters in polyhydroxyl compounds according to EP A 62 204 (US A 44 35 537) or according to DE A 33 00 474; dispersions of organic and/or inorganic fillers in polyols according to EP A 11 751 (US A 42 43 755); polyurea polyol dispersions according to DE A 31 25 402; tris-(hydroxyalkyl)isocyanurate polyol dispersions according to EP A 136 571 (US A 4 514 526) and crystallite suspensions according to DE A 33 42 176 and DE A 33 42 177 (US A 45 60 708), whereby the details in the aforesaid patents are to be regarded as a part of the patent disclosure, and are herein incorporated by reference.

Like the polyester polyols, the polyether polyols may be used either individually or in the form of mixtures. Furthermore, they can be mixed with the aforesaid dispersions, suspensions, or polyester polyols as well as the polyester amides containing hydroxyl groups, the polyacetals, and/or polycarbonates.

Examples of hydroxyl group-containing polyacetals that can be used include, for example, the compounds that can be produced from glycols such as diethylene glycol, triethylene glycol, 4,4'-dihydroxyethoxydiphenyldimethylmethane, hexanediol and formaldehyde. Suitable polyacetals can also be produced by polymerization of cyclic acetals.

Suitable hydroxyl group-containing polycarbonates include those of the known type such as those obtained by reaction of diols, e.g., 1,3-propanediol, 1,4-butanediol and/or 1,6-hexanediol, diethylene glycol, triethylene glycol or tetraethylene glycol and diaryl carbonates, e.g., diphenyl carbonate, or phosgene.

The polyester amides include the mainly linear condensates obtained from multivalent saturated and/or unsaturated carboxylic acids an their anhydrides and multivalent saturated and/or unsaturated amino alcohols or mixtures of multivalent alcohols and amino alcohols and/or polyamines.

Mixtures which have proven most preferred as polyhydroxyl compounds (b) and which are thus preferably used are those which, based on 100 parts by weight, comprise:

(bi) 0 to 95 parts by weight, more preferably 20 to 80 parts by weight of a polyether polyol initiated with sucrose having a hydroxyl number of from 300 to 500, more preferably 350 to 450, based on 1,2-propylene oxide or 1,2-propylene oxide and ethylene oxide;

(bii) 0 to 15 parts by weight, more preferably 5 to 15 parts by weight of a polyether polyol initiated with sorbitol having a hydroxyl number of from 400 to 600, more preferably 450 to 550, based on 1,2-propylene oxide or 1,2-propylene oxide and ethylene oxide;

(biii) 0 to 20 parts by weight, more preferably 5 to 15 parts by weight of a polyether polyol initiated with ethylenediamine having a hydroxyl number of from 700 to 850, more preferably 750 to 800, based on 1,2-propylene oxide; and (biv) 0 to 60 parts by weight, more preferably 5 to 40 parts by weight of a polyether polyol having a hydroxyl number of from 400 to 600, more preferably 450 to 550, based on 1,2-propylene oxide or 1,2-propylene oxide and ethylene oxide prepared while using a mixture of sucrose and triethanolamine in a weight ratio of from 1:2 to 2:1 as an initiator molecule.

(c) The polyurethane foams can be prepared with or without using chain extending agents and/or crosslinking agents. To modify the mechanical properties, however, it has proven advantageous to add chain extenders, crosslinking agents or optionally even mixtures thereof. Suitable chain extenders and/or crosslinking agents include alkanolamines, more preferably diols and/or triols with molecular weights of less than 400, preferably 60 to 300. Typical examples are alkanolamines such as, for example, ethanolamine and/or isopropanolamine; dialkanolamines, such as, for example, diethanolamine, N-methyl-, N-ethyldiethanolamine, diisopropanolamine; trialkanolamines such as, for example, triethanolamine, triisopropanolamine; and the addition products from ethylene oxide or 1,2-propylene oxide, and alkylenediamines having 2 to 6 carbon atoms in the alkylene radical such as, for example, N,N'-tetrakis(2-hydroxyethyl)ethylenediamine and N,N'-tetrakis(2-hydroxypropyl)ethylenediamine, aliphatic, cycloaliphatic and/or araliphatic diols having 2 to 14, more preferably 4 to 10 carbon atoms such as, for example, ethylene glycol, 1,3-propanediol, 1,10-decanediol, o-, m-, p-dihydroxycyclohexane, diethylene glycol, dipropylene glycol, and preferably 1,4-butanediol, 1,6-hexanediol, and bis-(2-hydroxyethyl)-hydroquinone; triols such as 1,2,4-, 1,3,5-trihydroxy- cyclohexane, glycerine and trimethylolpropane; and lower molecular weight hydroxyl group containing polyalkylene oxides, based on ethylene oxide and/or 1,2-propylene oxide and aromatic diamines such as, for example, toluene diamines and/or diaminodiphenylmethanes as well as the aforesaid alkanolamines, diols, and/or triols as initiator molecules.

If chain extending agents, crosslinking agents, or mixtures thereof are used in the preparation of polyurethane foams, then advantageously these are used in a quantity of from 0 to 20 weight percent, more preferably 2 to 5 weight percent, based on the weight of the polyhydroxyl compound (b).

(d) Suitable catalysts (d) include especially compounds that greatly accelerate the reaction of the hydroxyl group containing compounds of components (b) and optionally (c) with the polyisocyanates (a). Examples include organic metal compounds, preferably organic tin compounds such as tin(II) salts of organic carboxylic acids, e.g., tin(II) acetate, tin(II) dioctoate, tin(II) ethylhexoate and tin(II) laurate, as well as the dialkyltin(IV) salts of organic carboxylic acids, e.g., dibutyltin diacetate, dibutyltin dilaurate, dibutyltin maleate, and dioctyltin diacetate. The organic metal compounds are used alone or preferably in combination with strong basic amines. Examples include amines such as 2,3-dimethyl-3,4,5,6-tetrahydropyrimidine, tertiary amines such as triethylamine, tributylamine, dimethylbenzylamine, N-methylmorpholine, N-ethylmorpholine, N-cyclohexylmorpholine, N,N,N',N'-tetramethylethylenediamine, N,N,N',N'-tetramethylbutanediamine, pentamethyldiethylenetriamine, tetramethyldiaminoethyl ester, bis(dimethylaminopropyl) urea, dimethylpiperazine, 1,2-dimethylimidazole, 1-aza-bicyclo[3.3.0]octane and preferably 1,4-diaza-bicyclo[2.2.2]octane and alkanolamine compounds such as triethanolamine, triisopropanolamine, N-methyl- and N-ethyldiethanolamine and dimethylethanolamine.

Suitable catalysts include tris(dialkylamino)-s-hexahydrotriazines, especially tris(N,N-dimethylaminopropyl)-s-hexahydrotriazine, tetraalkylammonium hydroxides such as tetramethylammonium hydroxide, alkali hydroxides such as sodium hydroxide and alkali alcoholates such as sodium methylate and potassium isopropylate as well as alkali salts of long-chain fatty acids with 10 to 20 carbons and optionally OH pendent groups. 0.001 to 5 weight percent, especially 0.05 to 2 weight percent, of catalyst or catalyst combination, based on the weight of component (b) is preferred.

(e) Difluorochloromethane is used according to the present invention as a blowing agent in the preparation of polyurethane foam. However also suitable as a blowing agent are blowing agent mixtures from water, difluorochloromethane, and optionally trichlorofluoromethane, and most preferably mixtures comprising:
(ei) 0.05 to 4.0 parts by weight, more preferably 0.1 to 3.5 parts by weight of water;
(eii) 5 to 30 parts by weight, more preferably 8 to 20 parts by weight of difluorochloromethane; and
(eiii) 0 to 30 parts by weight, more preferably 0 to 20 parts by weight of trichlorofluoromethane.

Depending on desired density of the polyurethane foam, the trifluorochloromethane is used in a quantity of from 10 to 42 parts by weight, more preferably 12 to 35 parts by and the blowing agent mixture is used in a quantity of from 10 to 35 parts by weight, more preferably 10 to 30 parts by weight each based on 100 parts by weight of said polyhydroxyl compound (b).

The difluorochloromethane is incorporated in a conventional fashion into at least one of starting components (a), (b), or (c) to prepare the polyurethane foam, or it is directly fed into the reaction mixture advantageously by means of a suitable mixing device. The difluorochloromethane can, for example, be fed into optionally by means of stirring, the polyhydroxyl compound (b) to achieve the difluorochloromethane partial pressure required for the desired foam density, or it can be dissolved in the polyhydroxyl compound by compression in the suitable mix tank and/or it can be dissolved in the polyisocyanate following prior drying. According to another method, it can be mixed into at least one starting component, preferably the polyhydroxyl compound by means of a connected mixing device to achieve the required partial pressure for the desired foam density, or it can be fed in via a gas metering instrument and a separate feed line directly into the mix head and there it is intensively mixed with the other starting components to prepare the polyurethane foam.

(f) Optionally other additives and/or auxiliaries (f) may be incorporated into the reaction mixture to produce the polyurethane foam. Examples include surface active substances, foam stabilizers, cell regulators, fillers, dyes, pigments, flame retardants, hydrolysis preventing agents, fungistatic and bacteriostatic agents.

Examples of surface active substances include compounds that support the homogenization of the starting materials and are optionally also suitable for regulating cell structure. Examples include emulsifiers such as the sodium salts of castor oil sulfates or of fatty acids as well as salts of fatty acids with amines, e.g., diethanolamine oleate, diethanolamine stearate, diethanolamine ricinoleate, salts of sulfonic acids, e.g., alkali or ammonium salts of dodecylbenzenesulfonic acid or dinaphthylmethanedisulfonic acid and ricinoleic acid; foam stabilizers such as siloxane-oxalkylene mixed copolymers and other organopolysiloxanes, oxethylated alkylphenols, oxethylated fatty alcohols, paraffin oils, castor oil and ricinoleic acid esters, Turkey red oil and peanut oil; as well as cell regulators such as paraffins, fatty alcohols and dimethyl polysiloxanes. Furthermore, the oligomeric acrylates with polyoxyalkylene and fluoroalkane side groups are also suitable for improving the emulsifying effect, the cell structure and/or for stabilizing the foam. These surface-active substances are generally used in amounts of 0.01 to 5 parts by weight based on 100 parts by weight of component (b).

Fillers, especially reinforcing fillers are understood to refer to the known conventional organic and inorganic fillers, reinforcing agents, weighting agents, agents to improve abrasion properties in paints, coatings agents, etc. Specific examples include inorganic fillers, such as silicate minerals, such as laid silicates; e.g. antigorite, serpentine, hornblends, amphiboles, chrysotile, talc; metal oxides such as kaolin, aluminum oxides, aluminum silicate, titanium oxides and iron oxides, metal salts such as chalk, heavy spar; and inorganic pigments such as cadmium sulfide, zinc sulfide as well as glass, etc. Examples of organic fillers include carbon black, melamine, colophony, cyclopentadienyl resins and graft polymers.

The organic and inorganic fillers may be used individually or as mixtures and are advantageously incorporated into the reaction mixture in amounts of 0.5 to 50 weight percent, preferably 1 to 40 weight percent, based on the weight of components (a) to (c).

Suitable flame retardants include, for example, tricresyl phosphate, tris-(2-chloroethyl)phosphate, tris-(2-chloropropyl)phosphate, tris-(2,3-dibromopropyl)phosphate, tris(1,3-dichloropropyl)phosphate and tetrakis-(2-chloroethyl)-ethylene diphosphate.

In addition to the aforementioned halogen substituted phosphates, inorganic flame retardants may also be used such as red phosphorus, aluminum hydroxide, antimony trioxide, arsenic oxide, aluminum polyphosphate and calcium sulfate; or cyanuric acid derivatives such as melamine or mixtures of at least two flame retardants, such as for example, ammonium polyphosphates and melamine, plus optionally starches for making the composite elements of the present invention flame resistant. In general, it has proven advantageous to use 5 to 50 parts by weight, preferably 5 to 25 parts by weight, of the aforementioned flame retardants or mixtures thereof for each 100 parts by weight of components (a) through (c). Details regarding the aforementioned other conventional additives and auxiliaries can be obtained from the technical literature, e.g., the monograph by J. H. Sauders and K. C. Frisch "High Polymers," volume XVI, *Polyurethanes*, parts 1 and 2, Interscience Publishers, 1962 and 1964, or *Plastics Handbook, Polyurethanes*, volume VII, Carl Hanser Publishers, Munich, Vienna, 1st and 2nd editions, 1966 and 1983.

To prepare the polyurethane foam for the composite elements the organic, optionally modified polyisocyanates (a), the polyhydroxyl compounds (b), and optionally the chain extending agents and/or crosslinking agents (c) are reacted in such quantities so that the equivalent ratio of NCO groups from the polyisocyanates (a) to the total of the reactive hydrogen atoms of the (b) components and optionally (c) is from 0.85 to 2:1, more preferably 0.95 to 1.15:1 and, most preferably approximately 1.0 to 1.10:1.

The composite elements of the present invention can be prepared either batchwise or continuously according to conventional processes. According to a preferred embodiment, the back side of the polystyrene top lay (A) is coated, for example, by applying or spraying a foamable reaction mixture which forms the polyurethane foam then the reaction mixture is allowed to foam and cure.

According to another method, the polyurethane foam made which is either partially or completely cured and which is used to form the sandwich element can be provided with a second covering or top layer of preferably toughened polystyrene or a protective or decorative layer, for example, made of non-printed or printed paper, made of a film of plastic, for example, of polyethylene, polyamide, or a thermoplastic polyurethane, or made from metal, for example, aluminum. However, the foamable reaction mixture can also be placed in an open polystyrene mold and be allowed to foam there. However, following a preferred processing technique especially for foaming hollow spaces in low temperature compartment housings of toughened polystyrene the foamable reaction mixture is introduced at a temperature of from 10° to 90° C., more preferably 20 to 60° C., into the essentially closed hollow space of the optionally heated mold of preferably toughened polystyrene or it is injected under a pressure of from 1 to 10 bar and subsequently allowed to cure in the confined hollow space under compression. The free space mold temperature is generally 15° to 70° C., more preferably 25° to 50° C., and the degree of compression is from 1.2 to 6, more preferably 1.5 to 4.

The polyurethane foam used according to the present invention efficaciously has a free foamed density of from 21 to 28 g/cm$^3$.

The composite elements of the present invention are used, for example, as sandwich elements for insulation purposes and as structural elements for low temperature housing compartments, most preferably for refrigerators and deep chest freezers.

EXAMPLE 1

Preparation of the polyurethane rigid foam
A component, a mixture comprising:

85 parts by weight of a polyoxypropylene polyol having an average functionality of 4.3 and a hydroxyl number of 400, prepared while using an aqueous sucrose solution as an initiator molecule;

8 parts by weight of a tetrafunctional polyoxypropylene polyol having a hydroxyl number of 770, prepared while using ethylenediamine as an initiator molecule;

3 parts by weight glycerine;

2 parts by weight water;

1.5 parts by weight of a siloxane polyether copolymer used as a foam stabilizer (commercial product Tegostab ® B8409 from the Goldschmidt Company of Essen, Federal Republic of Germany); and 2.0 parts by of weight of a mixture of dimethylcyclohexylamine and bis(dimethylamino)ethyl ether in a weight ratio of 4:1 used as a catalyst.

B-Component

A mixture of diphenylmethane diisocyanates and polyphenyl polymethylene-polyisocyanates having a NCO content of 31 weight percent.

5 kg of the A component was sparged in a 10 liter feed tank for 1 to 2 minutes using a vigorous difluorochloromethane stream in order to displace the air from the feed tank. Then the A component was gassed with the difluorochloromethane until the pressure in the feed tank was 3.2 bar. Accordingly, 15 parts by weight of difluorochloromethane was dissolved in 100 parts by weight of the A component.

The toughened polystyrene used as the top layer (A) and/or used for the preparation of the open, box shaped mold, had the following mechanical properties:

| | |
|---|---|
| Tensile strength according to DIN 53455 | 30 N/mm$^2$ |
| Percentage elongation at break according to DIN 53455 | 40% |
| Modulus of elasticity (Tensile test according to DIN 53452) | 1900 N/mm$^2$ |
| Flexural strength according to DIN 53452 | 46 N/mm$^2$ |
| Impact strength according to DIN 53453 at 23° C. | no break |
| at −40° C. and | >60 kJ/mm$^2$ |
| Notched bar impact strength according to DIN 53453 | 8 kJ/m$^2$ |

The difluorochloromethane containing A component and B component were mixed with the help of a high pressure foam machine in a weight ratio of 100:140, then the creamy reaction mixture having fine bubbles was placed in the open box shaped mold made of the aforesaid toughened polystyrene and finally the reaction mixture was allowed to foam and cure.

The following properties were measured on the foamable reaction mixture and on the resulting polyurethane rigid foam:

| | |
|---|---|
| Cream time | 0–1 sec |
| Tack free time | 42 sec |
| Density | 26 g/l |
| Cell profile | good |
| Lambda value | 0.0188 W/mK |
| Compressive strength parallel to the foaming direction | 153 kPa (DIN 43421) |
| Compressive strength perpendicular to the foaming direction | 97 kPA (DIN 53421) |

EXAMPLE 2

The procedure in Example 1 was followed, however, a 1 mm thick plaque of the aforesaid toughened polystyrene was coated with a foamable reaction mixture in such a quantity so that the resulting polyurethane rigid foam had a layer thickness of 50 mm.

The resulting composite element was placed for 20 minutes on powdered carbon dioxide. After emerging the composite element showed no signs of stress cracking corrosion.

Comparison Example

The procedure in Example 2 was followed, however, 35 parts by weight of trichlorofluoromethane was used a blowing agent in the A component in place of the difluorochloromethane.

In addition, to prepare the polyurethane rigid foam the A and B components were mixed in a weight ratio of 100:150.

The resulting composite element after lying 20 minutes on powdered carbon dioxide and following subsequent removal, revealed many bubbles and tears; typical signs of pronounced stress cracking corrosion.

The following properties were measured on the polyurethane rigid foam prepared in the same A and B components:

| | |
|---|---|
| Cream time | 6 sec |
| Tack free time | 40 sec |
| Density | 23 g/l |
| Cell profile | good |
| Lambda value | 0.0174 W/mK |
| Compressive strength parallel to the foaming direction | 139 kPa (DIN 53421) |
| Compressive strength perpendicular to the foaming direction | 94 kPA (DIN 53421) |

Example 1 and the comparison example also show that polyurethane rigid foam blown with difluorochloromethane has an improved compressive resistance according to DIN 53421 both parallel and perpendicular to the foaming direction.

We claim:

1. Composite elements having improved resistance against stress cracking corrosion, comprising:
   (A) at least one top layer of polystyrene; and
   (B) a layer of polyurethane foam, wherein the polyurethane foam is prepared while using difluorochloromethane as a blowing agent.

2. The composite element of claim 1 wherein the polyurethane foam is prepared while using a blowing agent mixture comprising:
   (i) 0.05 to 4.0 parts by weight of water;
   (ii) 5 to 30 parts by weight of difluorochloromethane; and
   (iii) 0 to 30 parts by weight of trichlorofluoromethane.

3. The composite element of claim 1 wherein said top layer (A) comprises a toughened polystyrene having:
   a tensile strength according to DIN 53455 of from 20 to 45 $N/mm^2$;
   a percentage elongation break according to DIN 53455 of from 15 to 45 percent;
   a modulus of elasticity (tensile test) according to DIN 53457 of from 1650 to 2800 $N/mm^2$;
   a flexural strength according to DIN 53452 of from 36 to 78 $N/mm^2$;
   an impact strength according to DIN 53453 at 23° C. without break, of up to 65 $kJ/m^2$ and greater and at −40° C. without break, up to 65 $kJ/m^2$ and greater; and
   a notched bar impact strength according to DIN 53453 of from 4 to 10.5 $kJ/m^2$;
   measured on injection molded, normal small, bars or according to DIN 53455 on shoulder bars.

4. The composite element of claim 1 wherein layer (B) comprises a polyurethane rigid foam blown using difluorochloromethane.

5. The composite element of claim 1 wherein the polyurethane foam of layer (B) is prepared by reacting:
   (a) organic preferably aromatic polyisocyanates with:
   (b) at least one polyhydroxyl compound having a functionality of from 2 to 8 and a hydroxyl number of from 150 to 850 and optionally;
   (c) chain extending agents and/or crosslinking agents; in the presence of:
   (d) catalysts;
   (e) difluorochloromethane or a blowing agent mixture comprising:
      (ei) 0.05 to 4.0 parts by weight of water;
      (eii) 5 to 30 parts by weight of difluorochloromethane; and
      (eiii) 0 to 30 parts by weight of trichlorofluoromethane;
   said mixture is used in a quantity of from 10 to 35 parts by weight, based on 100 parts by weight of polyhydroxyl compound (b); and
   (f) optionally auxiliaries and/or additives.

6. Composite element of claim 1 wherein a mixture of diphenylmethane diisocyanates and polyphenyl polymethylenepolyisocyanates having a diphenylmethane diisocyanate isomeric content of from 30 to 80 weight percent is used as the organic polyisocyanate (a) to prepare the polyurethane rigid foam layer (B).

7. The composite element of claim 1 wherein to prepare layer (B) from polyurethane rigid foam a mixture of the following is used as the polyhydroxyl compound, said mixture, based on 100 parts by weight, comprises:
   (bi) 0 to 95 parts by weight of a polyether polyol initiated with sucrose having a hydroxyl number of from 300 to 500;
   (bii) 0 to 15 parts by weight of a polyether polyol initiated with sorbitol having a hydroxyl number of from 400 to 600;
   (biii) 0 to 20 parts by weight of a polyether polyol initiated with ethylenediamine having a hydroxyl number of from 700 to 850; and
   (biv) 0 to 60 parts by weight of a polyether polyol having a hydroxyl number of from 400 to 600, prepared while using a sucrose triethanolamine mixture as an initiator molecule.

8. Composite elements having improved resistance against stress cracking corrosion for low temperature compartment housings, comprising:
   (A) a covering layer of toughened polystyrene; and
   (B) a intermediate layer of polyurethane rigid foam; said composite elements are prepared by foaming the hollow space of toughened polystyrene wherein said polyurethane rigid foam is prepared by reacting:
   (a) aromatic polyisocyanates with:
   (b) at least one polyhydroxyl compound having a functionality of from 2 to 8 and a hydroxyl number of from 150 to 850 and optionally;
   (c) chain extending agents and/or crosslinking agents; in the presence of:
   (d) catalysts;
   (e) difluorochloromethane as a blowing agent; and
   (f) optionally auxiliaries and/or additives.

9. The composite elements of claim 8 wherein said reaction mixture is introduced into a covering layer A) shaped to form a hollow compartment and allowed to foam under compression utilizing a degree of compression of from 1.2 to 6.

10. The composite elements of claim 8 wherein a mixture of the following is used as said blowing agent (e):

(ei) 0.05 to 4.0 parts by weight of water;
(eii) 5 to 30 parts by weight of difluorochloromethane; and
(eiii) 0 to 30 parts by weight of trichlorofluoromethane;

said mixture, based on 100 parts by weight of polyhydroxyl compound (b), is used in a quantity of from 10 to 35 parts by weight.

* * * * *

UNITED STATES PATENT AND TRADEMARK OFFICE
CERTIFICATE OF CORRECTION

PATENT NO. : 4,996,103

DATED : February 26, 1991

INVENTOR(S) : Rolf Henn, Reinhard Leppkes

It is certified that error appears in the above-identified patent and that said Letters Patent is hereby corrected as shown below:

The title page should be deleted to appear as per attached title page.

Figure 2:
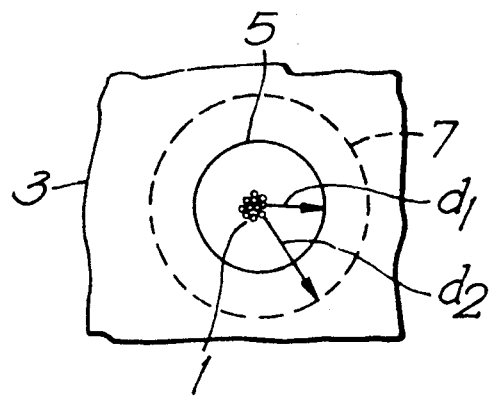
Figure 3:
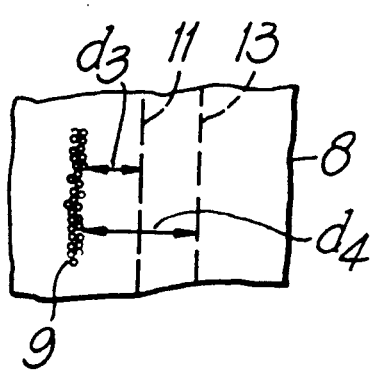
Figure 4:
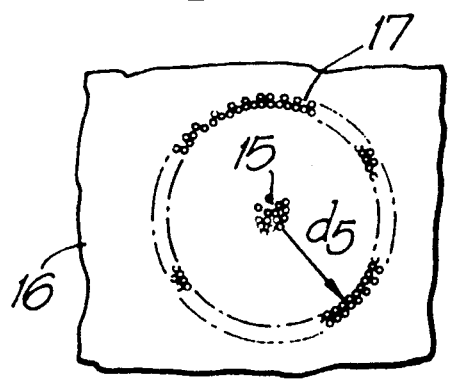
Figure 5:
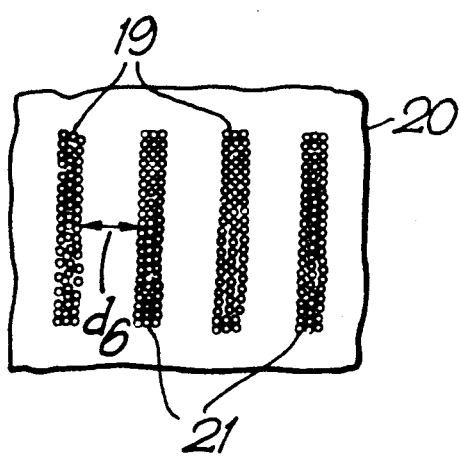
Figure 6:
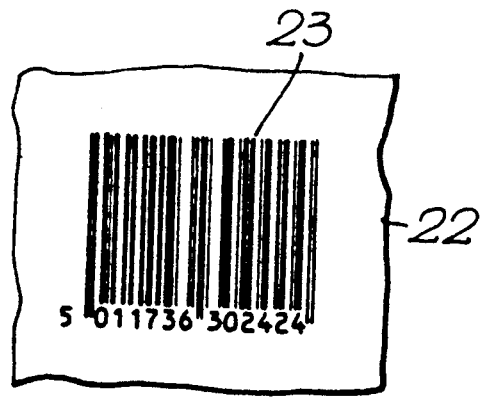

The sheet of drawing consisting of Figs 1-6 should be deleted.

Signed and Sealed this

Fifteenth Day of December, 1992

Attest:

DOUGLAS B. COMER

*Attesting Officer*  *Acting Commissioner of Patents and Trademarks*

United States Patent [19]

Henn et al.

[11] Patent Number: 4,996,103

[45] Date of Patent: Feb. 26, 1991

[54] COMPOSITE ELEMENTS HAVING IMPROVED RESISTANCE AGAINST STRESS CRACKING CORROSION, MOST PREFERABLY FOR LOW TEMPERATURE HOUSING COMPARTMENTS

[76] Inventors: Rolf Henn, 7 Adolf-Engelhardt-Strasse, 6900 Heidelberg; Reinhard Leppkes, 2 Eschkopfstrasse, 6712 Bobenheim-Roxheim, both of Fed. Rep. of Germany

[21] Appl. No.: 502,189

[22] Filed: Mar. 30, 1990

[30] Foreign Application Priority Data

April 22, 1989 [DE] Fed Rep of Germany ...... 3913328

[51] Int. Cl.⁵ ............................................. B32B 3/26

[52] U.S. Cl. ............................... 428/305.5; 428/319.7

[58] Field of Search ...................... 428/305.5, 319.7

[56] References Cited

U.S. PATENT DOCUMENTS

| | | | |
|---|---|---|---|
| 2,976,577 | 3/1961 | Gould | 428/319.7 |
| 3,398,035 | 8/1968 | Cleereman et al. | 428/319.7 |
| 3,640,918 | 2/1972 | Finelli | 428/319.7 |

*Primary Examiner*—William J. Van Balen
*Attorney, Agent, or Firm*—Martin P. Connaughton

[57] ABSTRACT

The invention deals with composite elements having improved resistance against stress cracking corrosion especially for low temperature housing compartments, comprising:

(a) at least one top layer of polystyrene, preferably toughened polystyrene, having certain mechanical properties; and (B) a layer of polyurethane foam, preferably polyurethane rigid foam;

said polyurethane rigid foam prepared while using difluorochloromethane as a blowing agent or a blowing agent mixture which essentially comprises water, difluorochloromethane, and optionally trichlorofluoromethane.

10 Claims, No Drawings